No. 649,024. Patented May 8, 1900.
W. D. WILLIAMS.
ROTARY RECIPROCATING ENGINE.
(Application filed Jan. 24, 1899. Renewed Dec. 14, 1899.)

(No Model.) 6 Sheets—Sheet 6.

Witnesses
Inventor
Wm. D. Williams

UNITED STATES PATENT OFFICE.

WIN D. WILLIAMS, OF FREDERICKSBURG, VIRGINIA, ASSIGNOR, BY DIRECT AND MESNE ASSIGNMENTS, OF PART TO JOHN F. KEY, SAMUEL L. STRAUGHAN, HENRY P. HOLDEN, GEORGE H. WHITTEMORE, AND PAUL R. VAN MATER, OF WASHINGTON, DISTRICT OF COLUMBIA, AND JOHN H. STEPHENS, OF VERNON, TEXAS.

ROTARY RECIPROCATING ENGINE.

SPECIFICATION forming part of Letters Patent No. 649,024, dated May 8, 1900.

Application filed January 24, 1899. Renewed December 14, 1899. Serial No. 740,363. (No model.)

*To all whom it may concern:*

Be it known that I, WIN D. WILLIAMS, a citizen of the United States, residing at Fredericksburg, in the county of Spottsylvania and State of Virginia, have invented certain new and useful Improvements in Rotary Reciprocating Engines; and I do hereby declare the following to be a full, clear, and exact description of the invention, such as will enable others skilled in the art to which it appertains to make and use the same.

This invention relates to rotary reciprocating engines, and the purpose in view is to materially reduce the space occupied by the parts contributing to the operation thereof, to multiply the propulsive effect of a given amount of actuating medium relatively to the dimensions of the receptive and movable parts controlled thereby and increase the horse-power considerably in excess of that heretofore attained by a similar quantitative pressure-feed, to economically utilize the direct full expansive or driving influence of the actuating medium in an unretarded manner by instituting a rapid exhaust and consequent immediate relief resulting from a removal of surrounding extraneous resistance on the parts or any tendency toward back pressure therein, and to generally simplify the structural incidentals and reduce the friction of the same to a minimum and also completely overcome dead-center.

The invention consists, essentially, of a rotatable open-end cylinder with pistons therein, an engine-shaft, a revoluble member movably fitted to the cylinder and connected to the pistons, and movable connections between the revoluble member and said engine-shaft.

The invention further consists of additional general and detail construction, arrangement, and combination of parts hereinafter described and claimed.

In the accompanying drawings, Fig. 2 is a side elevation of the device.

Figure 1:
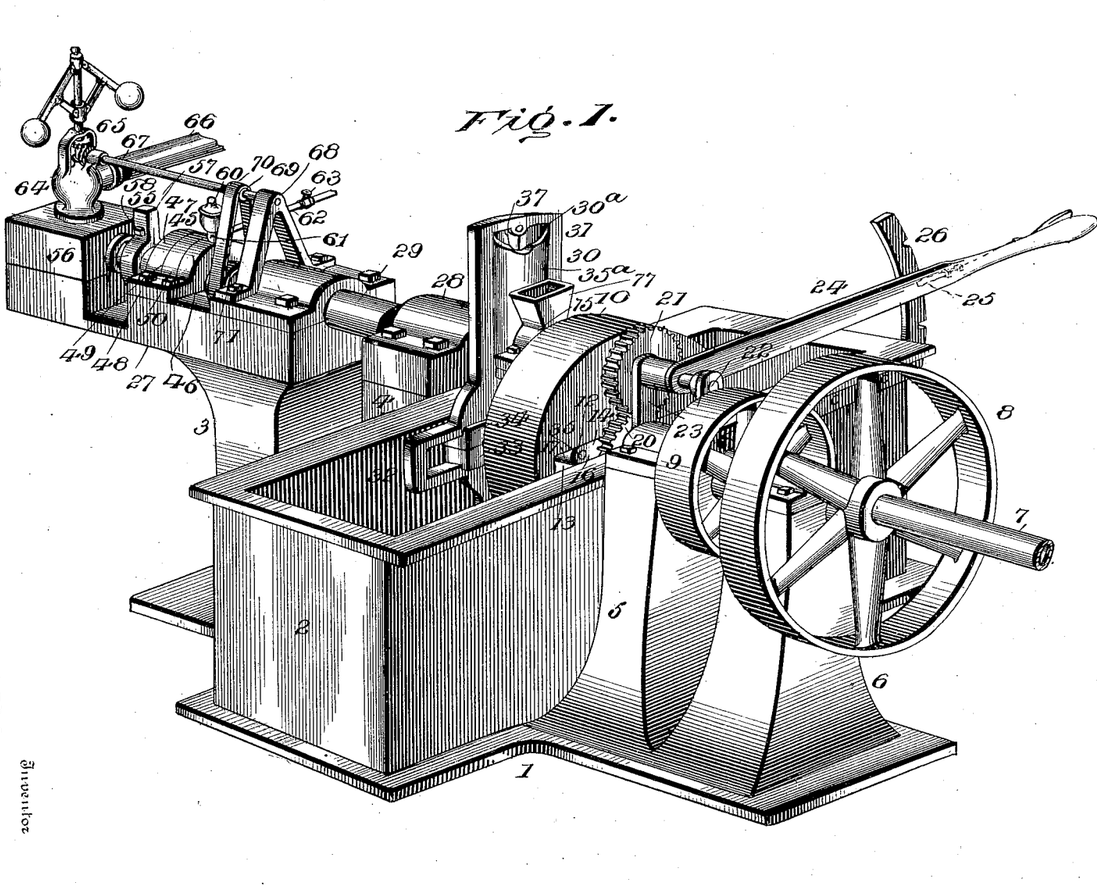
Figure 1 is a perspective view of an engine embodying the invention.
Figure 3:
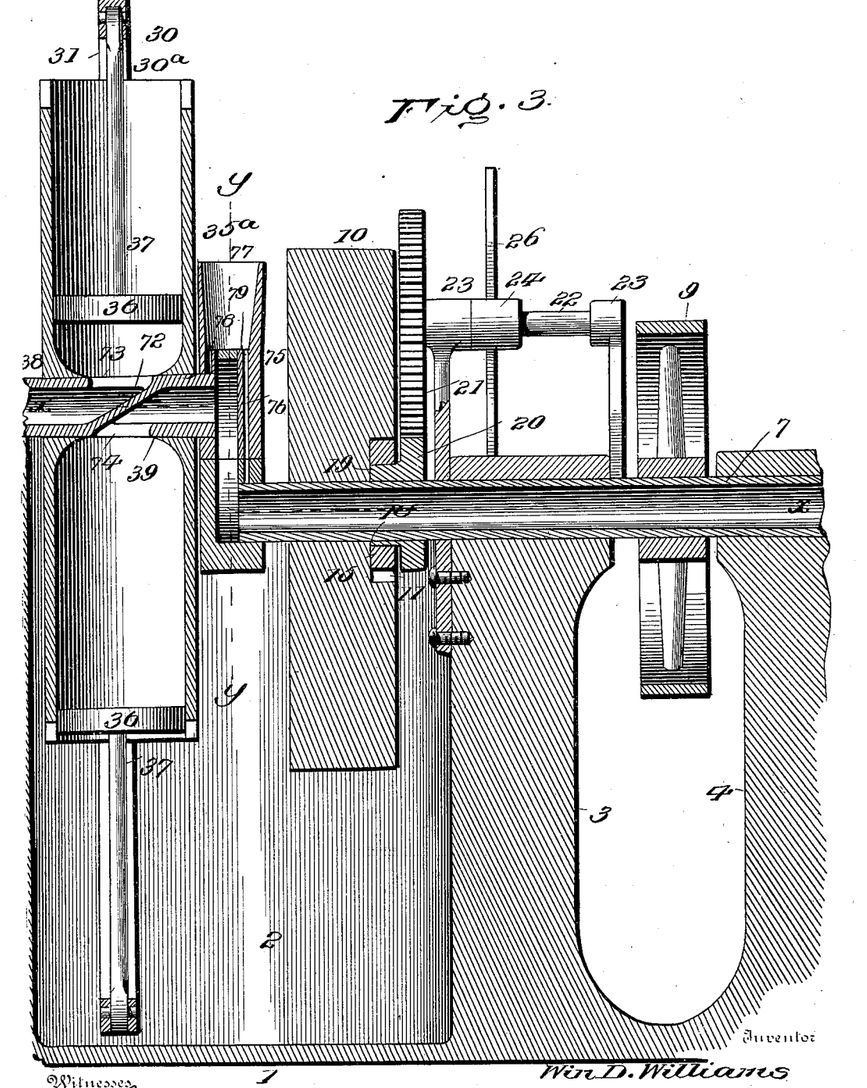
Fig. 3 is an enlarged longitudinal vertical section of a part of the device.
Figure 4:
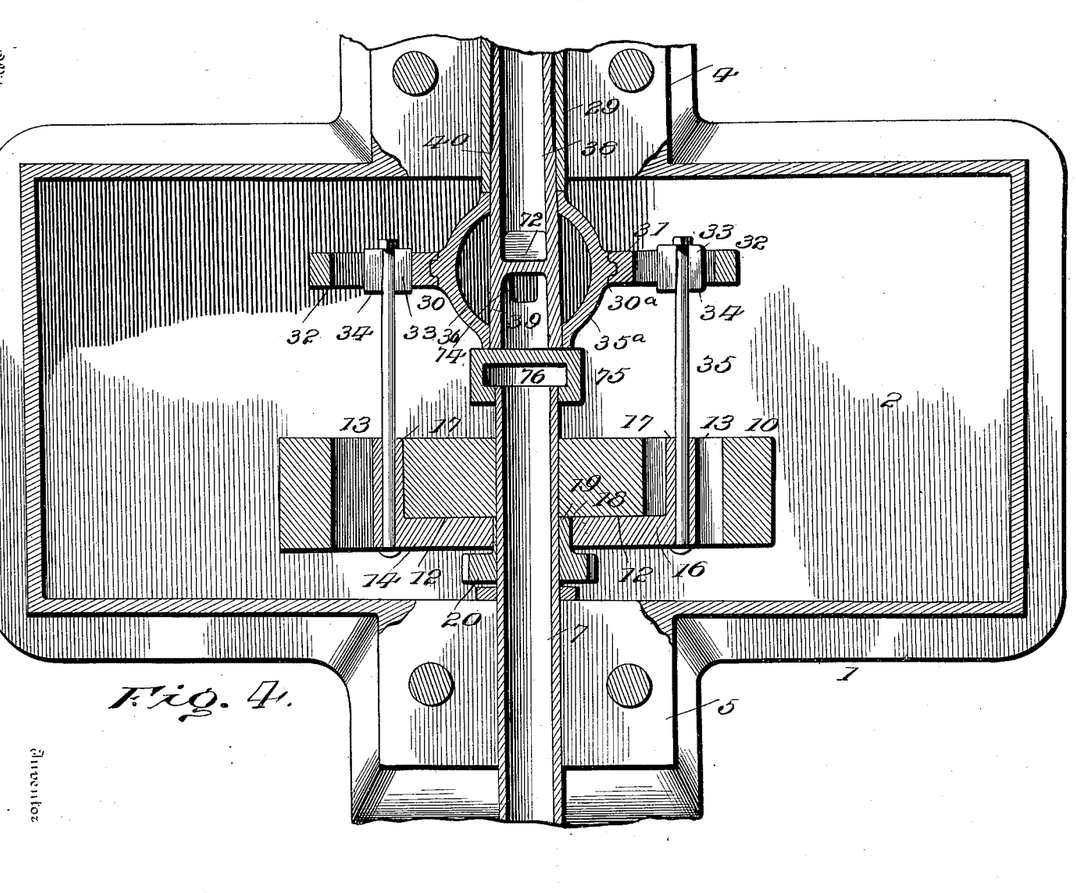
Fig. 4 is a horizontal section on the line $x\,x$, Fig. 3.
Figures 5, 6, 7:
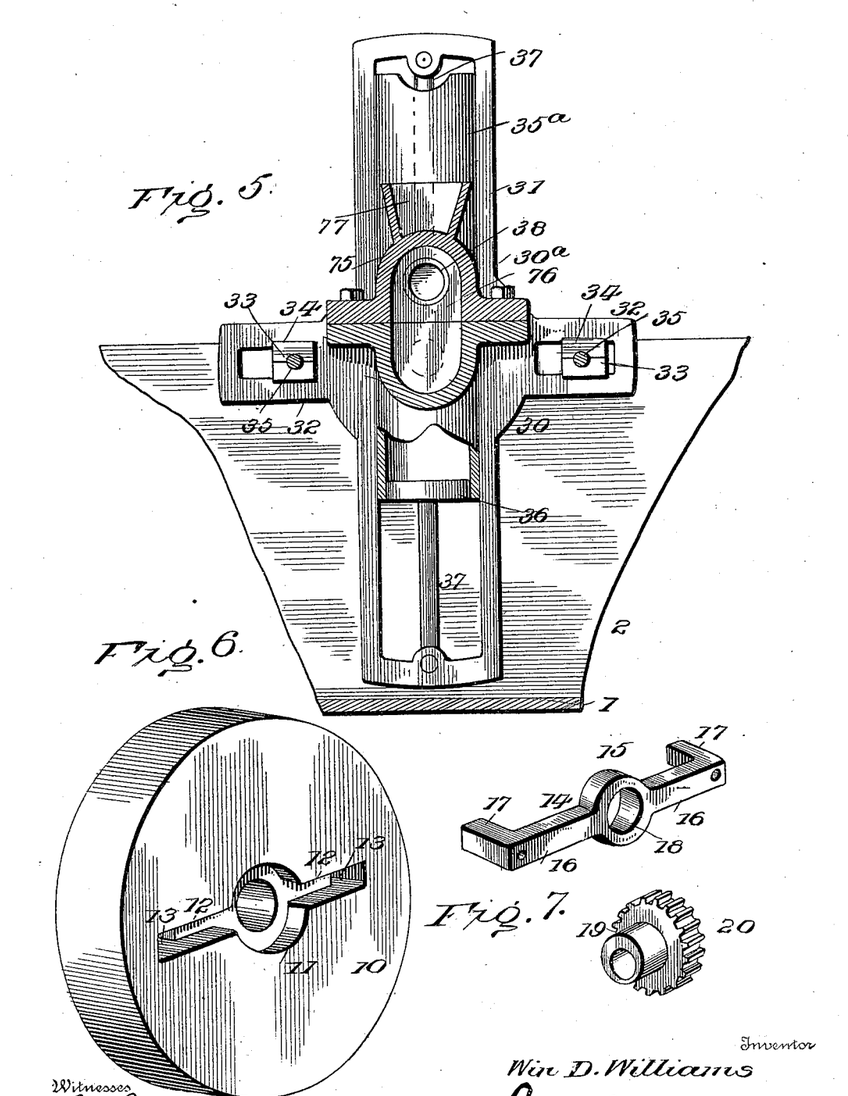
Fig. 5 is a transverse vertical section on the line $y\,y$, Fig. 3.
Fig. 6 is a detail perspective view of the engine-shaft disk.
Fig. 7 shows detail views of a cross-head carried by the engine-shaft disk and of a gear-eccentric for shifting the said head.
Figure 6:
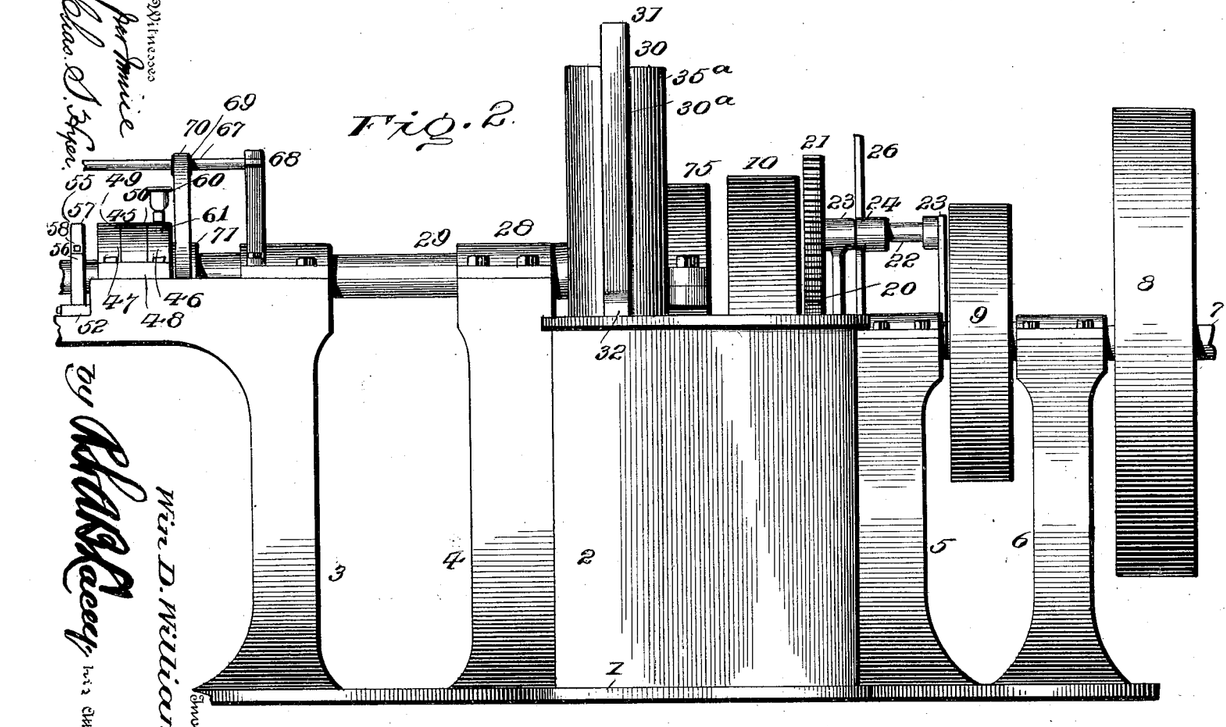
Figure 8:
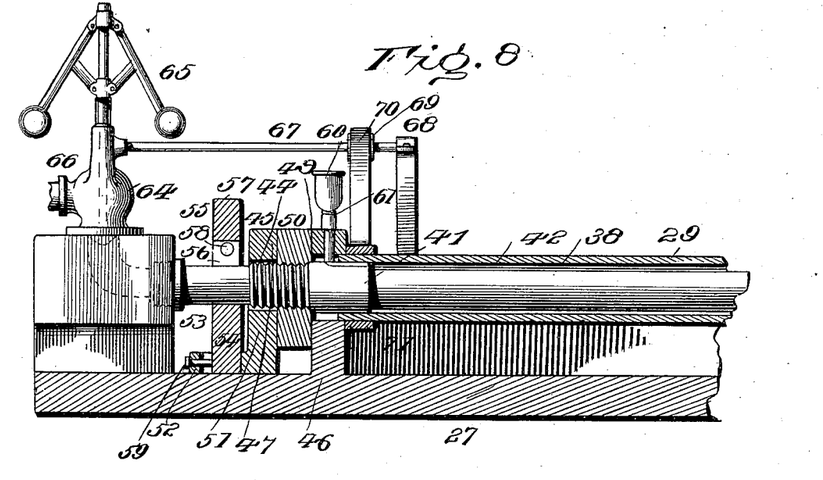
Fig. 8 is an enlarged longitudinal vertical section of the feeding end of the machine.
Figure 9:
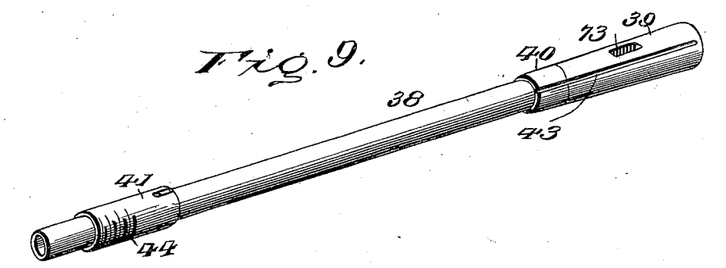
Fig. 9 is a detail perspective view of the elongated feed-valve.
Figure 10:
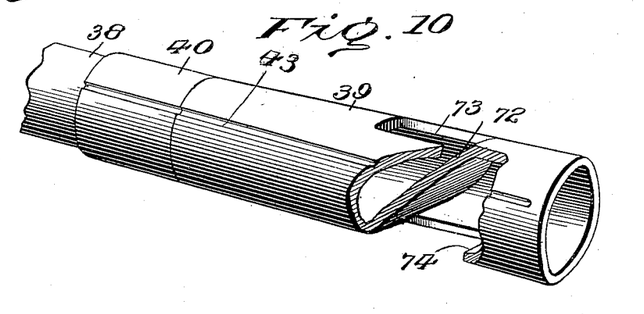
Fig. 10 is a detail perspective view of the inner end of said valve, shown broken away.

Referring to the drawings, wherein similar numerals are employed to indicate corresponding parts in the several views, the numeral 1 designates a bed-plate supporting or having erected thereon a box or casing 2, open at the top for housing a portion of the operative parts. Pillow blocks or standards 3, 4, 5, and 6 are positioned on the bed-plate 1 at serviceable intervals and support the various parts of the device, the two blocks or standards 3 and 6 being located at opposite ends and the others intermediate.

On the blocks 5 and 6 and the adjacent edge of the box or casing 2 an engine-shaft 7 is rotatably mounted in suitable journal-bearings and has a fly-wheel 8 keyed thereon outside of the block 6 and a band wheel or pulley 9 fast thereto between said blocks 5 and 6. The shaft 7 is tubular and extends across a portion of the upper part of the box or casing, and fixed to the same, inside the latter, is a disk 10, having a central circular recess 11, from which extend opposite radial slots 12, having communication with openings 13 at their outer ends, preferably of rectangular form. A cross-head 14 is shiftably seated in the disk 10 and has a central hub 15 loosely fitted around the shaft 7. The diameter of the hub 15 is less than that of the recess 11, and therefrom extend radial arms 16, having outer angular ends 17 of less width also than the length of the openings 13, and consequently said cross-head can be freely moved or adjusted in either one of two directions diametrically of the disk. The hub 15 of the cross-head also has a recess 18 in one side, and operatively located therein is an eccentric 19, having a peripherally-toothed circular flange 20. This flange is in mesh with an upper larger gear 21, fixed to a shaft 22, movable in bearings 23, and to which an adjusting-lever 24 is attached, having a suitable dog or catch 25 to engage a notched sector or analogous device 26, relatively situated thereto, and retain the said lever in the position desired.

On the pillow block or standard 3 a horizontal table 27 is supported, and on the upper end of the pillow block or standard 4 a suitable journal-bearing 28 is secured. On this table and in the journal-bearing 28 a tubular shaft 29 is rotatably mounted and located at a higher elevation than the engine-shaft 7. The shaft 29 extends inwardly to the box or casing 2, where it is indirectly connected to a yoke or slide-head 30, having an opening 30ª therethrough, and opposite sides 31, from the central portions of the edges of which extend slotted guides 32, also diametrically opposed in a plane at a right angle to said sides. In the slots of the guides 32 blocks or slides 33 have movement, and each comprises half-sections, with outer flanges 34 to fit over opposite parts of the guides. By this formation the blocks can be quickly seated or unseated, and extending therefrom are rods or elongated bolts 35, which pass through the angular ends 17 on the radial arms 16 of the cross-head 14 and also through adjacent parts of said arms. Thus the cross-head is connected to the blocks, and the rods or bolts hold the parts of the blocks intact and can be easily applied or detached.

A cylinder 35ª is fitted between the sides 31 of the yoke or slide-head 30, so that the latter may be freely moved thereon, and the opposite ends thereof are open. The cylinder is divided into two chambers by an intermediate separation thereof, and in each chamber a piston 36 is slidably mounted and has a piston-rod 37 projecting therefrom and movably attached at its outer end to the one end of the head 30. The inner ends of the cylinder-chambers are concave or dished, thereby forming spaces to receive the initial charge of steam or motive agent and enable the same to exert its maximum force for starting the pistons outward when at the limit of their inward stroke. The cylinder has a rotary movement only, and the pistons and yoke have a rotary movement about the axis of rotation of the cylinder and independent reciprocating motion rectilinearly and in a direction coinciding with the longitudinal axial center of the cylinder. The inner end of the shaft 29 is connected directly to the central part of the cylinder, and the relation between these two parts is invariable, and consequently the piston-rods 37 and pistons 36 are regularly variable as to their projection from and location in the chambers of the cylinder and proportionately to the movement of the head 30.

The shaft 29 partially incloses an elongated tubular valve 38, extending at its outer portion beyond the similar termination of said shaft. A suitable length of the inner portion of the valve projects inward beyond the shaft 29 and is provided with a flare 39, which centrally passes through the cylinder 35ª. The cylinder freely moves on and around the flare, and wear is compensated for by this arrangement, as will presently appear. From the beginning of the flare outwardly a suitable distance the valve is formed with a cylindrical bearing 40, and at the outer portion a similar bearing 41 of equal diameter is also situated. Between these bearings 40 and 41 the exterior part of the valve is uniformly reduced to construct a circumferential channel 42, and through the bearing 40 and flare 39 is a groove 43, having communication with said channel. Nearer the outer end of the valve and immediately following the bearing 41 the exterior part of the valve has screw-threads 44 thereon, and from thence outwardly the surface is unbroken and of regular diameter.

Over the bearing 41 and threads 44 and a part of the valve outside of the same a skeleton box 45 is fitted and comprises inner and outer arches 46 and 47, connected by opposite side flanges 48 and having a slot 49 between them. Surrounding the threads 44 of the valve and exposed through the slot 49 is an internally-screw-threaded collar 50, which is held against movement longitudinally of the valve by securing the flanges 48 to the table 27. By this collar acting in conjunction with the threads 44 the valve can be adjusted longitudinally and the position of the flare 39 changed in the cylinder 35 to take up wear and prevent too loose fitting of one part on the other. After an adjustment of the valve has been made it will be necessary to hold the same against accidental movement, and with this end in view a leg 51, depending from the outer portion of the box 45, has a horizontal foot 52, formed with a slot 53 to receive the lower end of an arm 54 of a clamp 55. This clamp is removably applied over the outer end of the valve and is provided with a central apertured collar 56, from which said arm 54 projects. Another arm 57, which is split a part of its length, also extends outwardly from the collar and has a bolt 58 therein to regulate the expansion of the clamp and also its binding effect. The lower end of the arm 54 is adjustably held also by a bolt or pin 59, passing through the foot 52 thereinto, and by this mechanism the valve will be prevented from having a self-rotation, but can be moved longitudinally at any time under ordinary conditions without changing the position of the clamp.

On the arch 46 is mounted an oil-cup 60, having a stem 61 feeding down through an opening in said arch. The outer end of the tubular shaft 29 terminates on the bearing 41 of the valve, but does not obstruct the passage of the oil through the passage. The oil passes over the bearing 41 into the circumferential channel 42, which forms, with the surrounding part of the shaft 29, an intermediate oil-reservoir, and from this the oil is fed through the groove 43 to freely and constantly lubricate the part of the cylinder 35ᵃ rotating thereon. To materially assist in driving the oil down from the cup 60, a reduced steam-feeding pipe 62, leading from a source of steam-supply, is connected to the stem 61 and has therein a regulating-valve 63.

The outermost end of the valve 38 connects with the globe 64 of any preferred form of governor 65, and to the said globe are also preferably attached a steam-conduit 66, intermediate the same, and a steam-generator. From said governor a shaft 67 extends longitudinally over and above the table 27, and the inner end has bearing in an elevated support 68. On this shaft is a small pulley or band-wheel 69, which is engaged by a belt 70, passing down and around a pulley or enlargement 71 on the shaft 29, and the speed of the engine is thus regulated and made controllable in accordance with the adjustment and operation of the governor. When actuating mediums other than steam are utilized, the governing mechanism will be changed accordingly, and such alterations as are necessary will be made fully within the purview of the invention.

The inner flare 39 of the valve 38 is internally divided by an obliquely-disposed partition 72, on opposite sides of which, in direct alinement, egress and ingress ports 73 and 74 are formed and always remain in the same relation to each other. The top egress-port 73 communicates in alternation with the inner terminations of the two chambers of the cylinder 35ᵃ, and the full expansive effect of steam or the propulsive force of any other actuating medium that may be used is unretardingly delivered to the inner faces of the pistons 36 at one side and likewise exhausted from the chambers through the ingress-port 74 back into the flare 39 of the valve 38 in rear of the partition 72. This partition is disposed at such an angle as to facilitate both the egress of the actuating medium and the ingress of the exhaust back into the flare of the valve 38, and such operations ensue at such time relatively to each other that the initial entrance of an incoming supply to one chamber occurs simultaneously with the beginning of outflow or exhaust from the other chamber, thereby entirely obviating any back-pressure resistance and rendering the primary operating devices quickly responsive to movement in their plane of rotation and also instituting a practicable counterbalancing of the parts and a consequent absorption and overthrow of dead-center tendency.

The inner end of the valve 38 in its flared condition projects beyond the cylinder 35ᵃ into the box or casing 2 and is snugly fitted in the upper part of a coupling 75 and has direct communication with a chamber or passage 76 in the latter. With the lower part of said chamber the inner end of the tubular engine-shaft 7 has communication, and the exhaust-steam or motive fluid passes into chamber 76 from the valve 38 and out through the said engine-shaft. The latter may be extended any suitable distance or connection of an auxiliary conduit be made therewith to convey said exhaust-steam or motive fluid entirely away from the engine. In the upper part of the coupling an oil-reservoir 77 is provided and has one duct 78 leading from the bottom to the flare 39 of valve 38 to assist in the necessary lubrication at this point and a second duct 79 running down to the receptive opening for the inner end of the said engine-shaft 7 to thoroughly lubricate the latter.

Wherever the use of any tight joints, boxes, or packing may be found imperative and other than those enumerated, they will be utilized; but such devices only will be adopted as would naturally be suggested by the correlative parts to which they are applied. Neither is it intended to be understood that the precise connection between the cross-head 14 and the head 30 on the shaft 29, as heretofore described, is an exclusive form. This connection contemplates any movable attachment having an equivalent operation and capable of adjustment to reverse or change the direction of movement of the engine.

One of the most important features of this invention consists in arranging the engine-shaft 7 eccentric to or on one side of the plane of the shaft 29, so that the axes of the two shafts are out of alinement, and the cross-head in its diametric relation to the shaft 7 has always a greater projection on one side than the other when in operative position. Therefore it will be seen that a compound eccentricity exists, automatically variable in part, and having an effectual influence in different planes to overcome dead-center, and also producing a regular and increased speed of rotation of the said engine-shaft.

The piston-rods 37 are attached to the head 30 at diametrically-opposite points, and as the steam or other motive fluid successively enters the two chambers of the cylinder 35ᵃ through port 73 of the valve 38 the propulsive force thereof is concentrated in its most effective condition on the rod attached to that part of the head 30 having the shortest distance from the shaft 29 and said valve 38, and the strongest expansive or motive energy is utilized to move the head longitudinally of the cylinder and at the same time rotate both the head and cylinder in the desired direction. This movement of the head on the cylinder continues gradually through the entire revolution of said parts and with a regularity or uniformity in balance owing to a compensating change in position of the head on the cylinder and a consequent equality of distribution of weight and removal of obstructing resistance. Both piston-rods successively act to rotate the head and cylinder, and the steam or other motive fluid is fully active on the pistons thereof until the inner ends of the chambers of the cylinder are alternately brought into alinement or over the port 74, when immediate exhaust will ensue. This exhaust takes place in one chamber simultaneously with a recharging of the opposite chamber, and no counteracting resistance is offered by one piston and rod on the others, for the reason that at the time the one piston and its rod receives the most forceful impact of the steam or other motive medium the opposite chamber is empty and the slide-head is free to be moved by the then-active piston and rod. Therefore the piston and rod in the empty chamber are gradually drawn inwardly and when arriving over the port 73 are in proper position to effectively carry out the propulsive power of a new charge, which will be delivered thereto, and thus the revolution becomes continuous and rapid. As the head 30 is operating, as stated, the cross-head 14 is likewise rotated, and the blocks or slides 33 change position in the guides 32 and automatically compensate for the movement of said head. The disk 10 is actuated by the cross-head and the shaft 7 revolved.

To control the direction of rotation of the slide or head 30 and as well the movement of the engine as regards a reversal, the cross-head 14 is shifted with reference to the yoke or head 30 and cylinder 35ª, so as to stand with its effective leverage to one side or the other of the axis of the engine-shaft 7, and thereby initially throw the preponderance of leverage to either side and cause a start or movement of the engine in the direction of less resistance either right or left, as the adjustment of the cross-head may provide. This change of position of said cross-head 14 for the purpose mentioned is acquired through the operation of the lever 24, shaft 22, rotation of gear 21, and movement of the eccentric 19 through the medium of its toothed flange 20 in mesh with the said gear. As the position of the said eccentric is changed the cross-head 14 is moved with reference to the disk 10 in the manner aforesaid to compel rotation of the engine in the desired direction upon the admission of the motive medium or energizing agent into the cylinder.

To stop the engine, the supply of steam or motive fluid is cut off by suitable means, and previous to starting up again the head 30 and cylinder 35ª will be arranged by the mechanism just described to move in the desired direction.

In this engine it will be observed that great care has been exercised from both a structural and operative standpoint to avoid the least waste or useless expenditure of motive energy. In fact, from a predetermined amount of motive fluid the speed of revolution and resultant horse-power is considerably greater than has heretofore been possible, owing to the reduction of weight of actuated parts, the absorption of dead-center, the reduction of frictional resistance to a minimum, and the uniform and equable balance, which is self-regulable proportionately to the stress of the said motive fluid. By the introduction of the compound eccentric connections between the driving and driven or engine shaft the speed of the latter is materially augmented in the present instance, owing to the smaller dimension of the part of said connections having direct influence on said engine-shaft, which is an important advantage in this particular class of engines. Many other advantages will become readily apparent from time to time, and the efficiency and strength of the engine within a dimensional compass so much reduced as compared with previous devices of a kindred nature, and also the absence of appreciable vibrations, will nominate the invention a most valuable acquisition to the art pertaining to motive-power generators.

Having thus described the invention, what is claimed as new is—

1. In an engine of the character set forth, the combination with a rotatable open-ended cylinder, and pistons therein, of a yoke connecting the pistons for simultaneous action in opposite directions and revoluble with the cylinder and slidable rectilinearly in a direction parallel with the axis of the cylinder, an engine-shaft independent of the cylinder and its axial support and disposed out of line therewith, and connections operatively connecting the engine-shaft with the slidable and rotatable yoke, and having slidable connection with each, substantially as set forth.

2. In an engine of the character set forth, the combination with a rotatable open-ended cylinder, and pistons therein, of a yoke connecting the pistons for simultaneous action in opposite directions and revoluble with the cylinder and slidable rectilinearly in a direction parallel with the axis of the cylinder, an engine-shaft independent of the cylinder and its axial support and disposed out of line therewith, and a cross-head having slidable connection with the engine-shaft in a plane at a right angle to the sliding movement of the said yoke and having attachment with the latter and rotatable and slidable therewith, as and for the purpose set forth.

3. In an engine of the character set forth, the combination with a rotatable open-ended cylinder, and pistons therein, of a yoke connecting the pistons for simultaneous action in opposite directions and revoluble with the cylinder and slidable rectilinearly in a direction parallel with the axis of the cylinder, an engine-shaft independent of the cylinder and its axial support and disposed out of line therewith, a cross-head having slidable connection with the engine-shaft in a plane at a right angle to the sliding movement of the said yoke, and means slidably connecting the said cross-head with the said yoke whereby it is rotatable and slidable therewith and has an independent sliding movement, as and for the purpose described.

4. In an engine of the character set forth, the combination with a rotatable open-ended cylinder, and pistons therein, of a yoke connecting the pistons for simultaneous action in opposite directions and revoluble with the cylinder and slidable rectilinearly in a direction parallel with the axis of the cylinder, an engine-shaft independent of the cylinder and its axial support and disposed out of line therewith, a cross-head having slidable connection with the engine-shaft in a plane at a right angle to the sliding movement of the said yoke, means slidably connecting the said cross-head with the said yoke whereby it is rotatable and slidable therewith and has an independent sliding movement, and means for shifting the cross-head with respect to the engine-shaft and the said yoke to effect a reversal of the engine, substantially as described.

5. In an engine of the character set forth, the combination with a rotatable open-ended cylinder, and pistons therein, of a yoke connecting the pistons for simultaneous action in opposite directions and revoluble with the cylinder and slidable rectilinearly in a direction parallel with the axis of the cylinder, an engine-shaft independent of the cylinder and its axial support and disposed out of line therewith, a cross-head having slidable connection with the engine-shaft in a plane at a right angle to the sliding movement of the said yoke, means slidably connecting the said cross-head with the said yoke whereby it is rotatable and slidable therewith and has an independent sliding movement, an eccentric mounted upon the engine and forming a support for the said cross-head, and means for turning the eccentric to change the effective leverage of the cross-head, substantially as described.

6. In an engine of the character set forth, the combination with a rotatable open-ended cylinder, and pistons therein, of a yoke connecting the pistons for simultaneous action in opposite directions and revoluble with the cylinder and slidable rectilinearly in a direction parallel with the axis of the cylinder, an engine-shaft independent of the cylinder and its axial support and disposed out of line therewith, a cross-head having slidable connection with the engine-shaft in a plane at a right angle to the sliding movement of the said yoke, means slidably connecting the said cross-head with the said yoke whereby it is rotatable and slidable therewith and has an independent sliding movement, an eccentric mounted upon the engine-shaft and forming a support for the said cross-head, and a hand-lever operatively connected with the said eccentric for actuating it to shift the cross-head, as and for the purpose specified.

7. In an engine of the character set forth, the combination with a rotatable open-ended cylinder, and pistons therein, of a yoke connecting the pistons for simultaneous action in opposite directions and revoluble with the cylinder and slidable rectilinearly in a direction parallel with the axis of the cylinder, an engine-shaft independent of the cylinder and its axial support and disposed out of line therewith, a cross-head having slidable connection with the engine-shaft in a plane at a right angle to the sliding movement of the said yoke, means slidably connecting the said cross-head with the said yoke whereby it is rotatable and slidable therewith and has an independent sliding movement, an eccentric mounted upon the engine-shaft and forming a support for the said cross-head and having cog-teeth, a gear-wheel meshing with the said cog-teeth of the eccentric, a hand-lever operatively connected with the gear-wheel, and means for holding the said lever in an adjusted position, substantially as specified.

8. In an engine of the character set forth, the combination with a rotatable open-ended cylinder, and pistons therein, of a yoke connecting the pistons for simultaneous action in opposite directions and rotatable with the cylinder, and slidable rectilinearly in a direction parallel with the axis of the cylinder, an engine-shaft independent of the cylinder and its axial support, a disk or like part attached to the engine-shaft to rotate therewith, a cross-head slidably attached to the said disk, and means connecting the cross-head with the aforesaid rotatable and slidable yoke, substantially as specified.

9. In an engine of the character set forth, the combination with a rotatable open-ended cylinder, and pistons therein, of a yoke connecting the pistons for simultaneous action in opposite directions and rotatable with the cylinder and slidable rectilinearly in a direction parallel with the axis of the cylinder, an engine-shaft independent of the cylinder and its axial support, a disk or like part attached to the engine-shaft to rotate therewith and having oppositely-disposed radial slots, a cross-head slidably attached to the said disk, and connections between the aforementioned yoke and the terminal portions of the cross-head and passing through the slots of the said disk, substantially as set forth.

10. In an engine of the character set forth, the combination with a rotatable open-ended cylinder, and pistons therein, of a yoke connecting the pistons for simultaneous action in opposite directions and rotatable with the cylinder and slidable rectilinearly in a direction parallel with the axis of the cylinder, an engine-shaft independent of the cylinder and its axial support, a disk or like part attached to the engine-shaft to rotate therewith and having a diametrical seat in one face terminating in radial slots extending through opposite faces of the disk, a cross-head slidable in the said seat, and connections between the aforementioned yoke and the terminal portions of the cross-head and passing through the slots of the said disk, substantially as specified.

11. In an engine of the character set forth, the combination with a rotatable open-ended cylinder, and pistons therein, of a yoke connecting the pistons for simultaneous action in opposite directions and rotatable with the cylinder and slidable rectilinearly in a direction parallel with the axis of the cylinder, an engine-shaft independent of the cylinder and its axial support, a disk or like part attached to the engine-shaft to rotate therewith and having oppositely-disposed radial slots, a cross-head slidably attached to the said disk and having lateral terminal extensions projecting into the radial slots of the disk, and connections between the lateral terminal extensions of the cross-head and the said yoke, substantially as described.

12. In an engine of the character set forth, the combination with a rotatable open-ended cylinder, and pistons therein, of a yoke connecting the pistons for simultaneous action in opposite directions and rotatable with the cylinder and slidable rectilinearly in a direction parallel with the axis of the cylinder and having oppositely-disposed lateral guides, an engine-shaft independent of the cylinder and its axial support, a disk or like part attached to the engine-shaft to rotate therewith, a cross-head slidably attached to said disk, and means connecting the cross-head with the lateral guides of the aforesaid yoke, substantially in the manner specified.

13. In an engine of the character set forth, the combination with a rotatable open-ended cylinder, and pistons therein, of a yoke connecting the pistons for simultaneous action in opposite directions and rotatable with the cylinder and slidable rectilinearly in a direction parallel with the axis of the cylinder, and having oppositely-disposed lateral guides, slides mounted upon said guides, an engine-shaft independent of the cylinder and its axial support, a disk or like part attached to the engine-shaft to rotate therewith, a cross-head slidably attached to the said disk, and means connecting the terminals of the cross-head with the aforesaid slides, as and for the purpose set forth.

14. In an engine of the character set forth, the combination with a rotatable open-ended cylinder, and pistons therein, of a yoke connecting the pistons for simultaneous action in opposite directions and rotatable with the cylinder and slidable rectilinearly in a direction parallel with the axis of the cylinder, and having oppositely-disposed guides radially slotted, slides mounted in the slots of said guides, an engine-shaft independent of the cylinder and its axial support, a disk or like part attached to the engine-shaft to rotate therewith, and having a central recess and a diametrical seat in one face, and having radial slots in communication with the said seat, a cross-head slidably mounted in the said seat of the disk and formed medially with a recess, connections between the terminal portions of the cross-head and the said slides, an eccentric upon the engine-shaft and having a cross-head mounted thereon, and means for turning the eccentric to shift the relative position of the cross-head, as and for the purpose set forth.

15. In an engine of the character set forth, the combination with a rotatable open-ended cylinder, pistons therein, a yoke connecting the pistons for simultaneous action in opposite directions and revoluble with the cylinder and slidable rectilinearly in a direction parallel with the axis of the cylinder, and having lateral slotted guides, and slides mounted in the slotted guides, of an engine-shaft independent of the cylinder and its axial support and disposed out of line therewith, a disk secured to the engine-shaft and rotatable therewith and having a central recess, a diametrical seat and radial slots, a cross-head slidably mounted in the said seat and having lateral terminal extensions operating in the radial slots of the disk, connections between the terminal extensions of the cross-head and the aforementioned slides, an eccentric mounted upon the engine-shaft and forming a support for the said cross-head and having cog-teeth, a gear-wheel meshing with the said cog-teeth of the eccentric, a hand-lever operatively connected with the gear-wheel, and means for holding the said lever in an adjusted position, substantially as specified.

16. In an engine of the type described, the combination of a relatively fixed or stationary tubular shaft adapted to have a motive medium fed therethrough and provided with separated ingress and egress openings, a cylinder rotatably mounted upon the fixed shaft and having piston-chambers to alternately register with the said ingress and egress openings, and a rotary tubular engine-shaft coupled to the fixed tubular shaft for carrying off the spent motive medium, substantially as described.

17. In an engine of the type described, the combination of a relatively fixed or stationary tubular shaft adapted to have a motive medium fed therethrough and provided with separated ingress and egress openings, a cylinder rotatably mounted upon the fixed shaft and having piston-chambers to alternately register with the said ingress and egress openings, a rotary tubular engine-shaft out of line with the fixed shaft, and means for coupling the adjacent ends of the fixed and rotary shafts, as and for the purpose described.

18. In an engine of the type specified, the combination of a non-rotatable tubular shaft having a tapering portion provided with ingress and egress ports separated by an intermediate portion, a cylinder mounted to rotate about the said tapering portion of the shaft and having piston-chambers to alternately register with the ports therein, means for moving the said shaft longitudinally, a tubular engine-shaft out of line with the non-rotatable shaft and connected with the cylinder to rotate therewith, and a coupling connecting the two shafts and establishing communication between them, substantially as described.

19. In an engine of the type specified, a non-rotatable tubular feed-shaft having partitioned ingress and egress ports, a cylinder mounted to rotate about the said shaft and having piston-chambers to alternately communicate with the said ingress and egress ports, a rotatable engine-shaft, a coupling connecting the two shafts and establishing communication between them, and an oil-reservoir applied to the coupling and having passages leading therefrom to the two shafts to supply lubricant to the relatively-moving parts, substantially as described.

20. In an engine of the class described, a tubular valve having a tapering portion, a cylinder rotatably mounted upon the said tapering part of the valve, a bearing having an offstanding portion, means for adjusting the valve longitudinally, and a clamp applied to the valve and having engagement with the offstanding portion of the bearing, substantially as described.

21. In an engine of the variety set forth, a tubular valve having a tapering portion, a cylinder rotatably mounted upon the tapering portion of the valve, means for moving the valve longitudinally, a bearing having a slotted offstanding portion, and a clamp applied to the said valve and having a portion entering the slotted extension of the bearing, as and for the purpose specified.

22. In an engine of the character set forth, a tubular shaft bearing a cylinder and rotatably mounted, a tubular valve located within the said shaft and having its end portions closing the same and its intermediate portion of less diameter to form a passage, and an oil-cup in communication with the said passage through a groove formed in an enlarged end of the valve, substantially as described.

23. In an engine of the character set forth, the combination of a rotatable open-ended cylinder, a tubular shaft, a tubular valve located in said shaft and having a tapering portion provided with partitioned ingress and egress ports, means for preventing rotation of the valve, other means for adjusting the valve longitudinally, pistons operating in the cylinder, a yoke connecting the pistons for simultaneous action in opposite directions and revoluble with the cylinder and slidable rectilinearly in a direction parallel with the axis of the cylinder, a tubular engine-shaft independent of the cylinder and its shaft and disposed out of line therewith, a chambered coupling connecting the two shafts, a cross-head having slidable connection with the engine-shaft in a plane at a right angle to the sliding movement of the said yoke, means slidably connecting the said cross-head with the said yoke whereby it is rotatable and slidable therewith and has an independent sliding movement, an eccentric mounted upon the engine-shaft and forming a support for the said cross-head, and means mounted independently of the engine-shaft and operatively connected with the said eccentric for shifting it to reverse the motion of the engine, substantially as specified.

24. The combination of a rotary cylinder having a valve-seat, a hollow valve fitted to said seat and provided with feed and exhaust channels, a yoke in eccentric relation to the axial center of rotation of the cylinder, pistons in said cylinder, and connected with the yoke, an engine-shaft out of alinement with the axis of rotation of the cylinder and with the imaginary axis of the yoke, and a cross-head operatively connected with the engine-shaft and slidably connected with said yoke, substantially as described.

25. In a rotary engine, the combination of a revoluble multiple-chambered cylinder, an engine-shaft in eccentric relation to the axis of rotation of the cylinder, a shiftable yoke revoluble with the cylinder and connected operatively with the cylinder-pistons to be shiftable therewith, and a cross-head operatively connected with the engine-shaft and slidably connected with the yoke to be rotated thereby, substantially as described.

26. In a rotary engine, a shiftable and rotary yoke provided with transverse guideways for a cylinder, and with other guideways at right angles to the cylinder-guides, in combination with a rotary cylinder fitted to the first-named set of guideways, an engine-shaft, a cross-head having connections which are fitted in the guideways of the yoke, and a valve mechanism for supplying motive fluid to, and exhausting it from, the double cylinder, substantially as described.

In testimony whereof I affix my signature in presence of two witnesses.

WIN D. WILLIAMS. [L. S.]

Witnesses:
 FRANK K. TYLER,
 M. W. WHITE.